United States Patent [19]

Martin et al.

[11] Patent Number: 4,841,149

[45] Date of Patent: Jun. 20, 1989

[54] DEVICE FOR DETECTING MICRO-LEAKS OF GAS BY INFRARED RADIATIONS

[75] Inventors: André Martin, Toulon; Minh P. Luong, Montgeron, both of France

[73] Assignee: Technologies Speciales Ingenierie-T.S.I., Toulon, France

[21] Appl. No.: 162,816

[22] Filed: Mar. 1, 1988

[30] Foreign Application Priority Data

Mar. 6, 1987 [FR] France .................. 87 03212

[51] Int. Cl.$^4$ .................................. G01M 3/38
[52] U.S. Cl. ......................... 250/330; 250/338.1
[58] Field of Search ............ 250/330, 340, 341, 338.1; 92/107, 140; 248/363, 206.3

[56] References Cited

U.S. PATENT DOCUMENTS 4,204,120 5/1980 Riboulet et al. ................ 250/341

FOREIGN PATENT DOCUMENTS

| 1217758 | 5/1960 | France | 248/362 |
| 2453406 | 10/1980 | France . | |
| 2522147 | 8/1983 | France . | |
| 2586808 | 3/1987 | France . | |
| 62546 | 4/1983 | Japan | 250/341 |
| 1059297 | 12/1983 | U.S.S.R. | 248/363 |

OTHER PUBLICATIONS

Patent Abstracts of Japan, vol. 10, No. 64, (P-436)[2121], 14 Mars 1986; & JP-A-60 205 242, (Toshiba K.K.), 10-16-85.

Primary Examiner—Janice A. Howell
Assistant Examiner—Constantine Hannaher
Attorney, Agent, or Firm—Balogh, Osann, Kramer, Dvorak, Genova & Traub

[57] ABSTRACT

The present invention relates to a device for detecting micro-leaks of gas by directing the infrared radiation created by a thermal gradient onto a wall, which device comprises an enclosure provided with an opening equipped with sealing means designed to be placed in contact with the wall, a sealed tank separated from said enclosure by a partition wall, said tank housing an infrared camera of which the objective is situated in front of a lens which is permeable to infrared radiations, means for sealingly applying the enclosure against the wall, means for creating a partial vacuum inside the enclosure, and an insulating screen placed in the center of the opening of the enclosure and applied against said wall in order to filtrate the gas leaks drawn in by the vacuum effect, to obtain a thermal gradient detectable by thermovision.

12 Claims, 4 Drawing Sheets

Fig_2

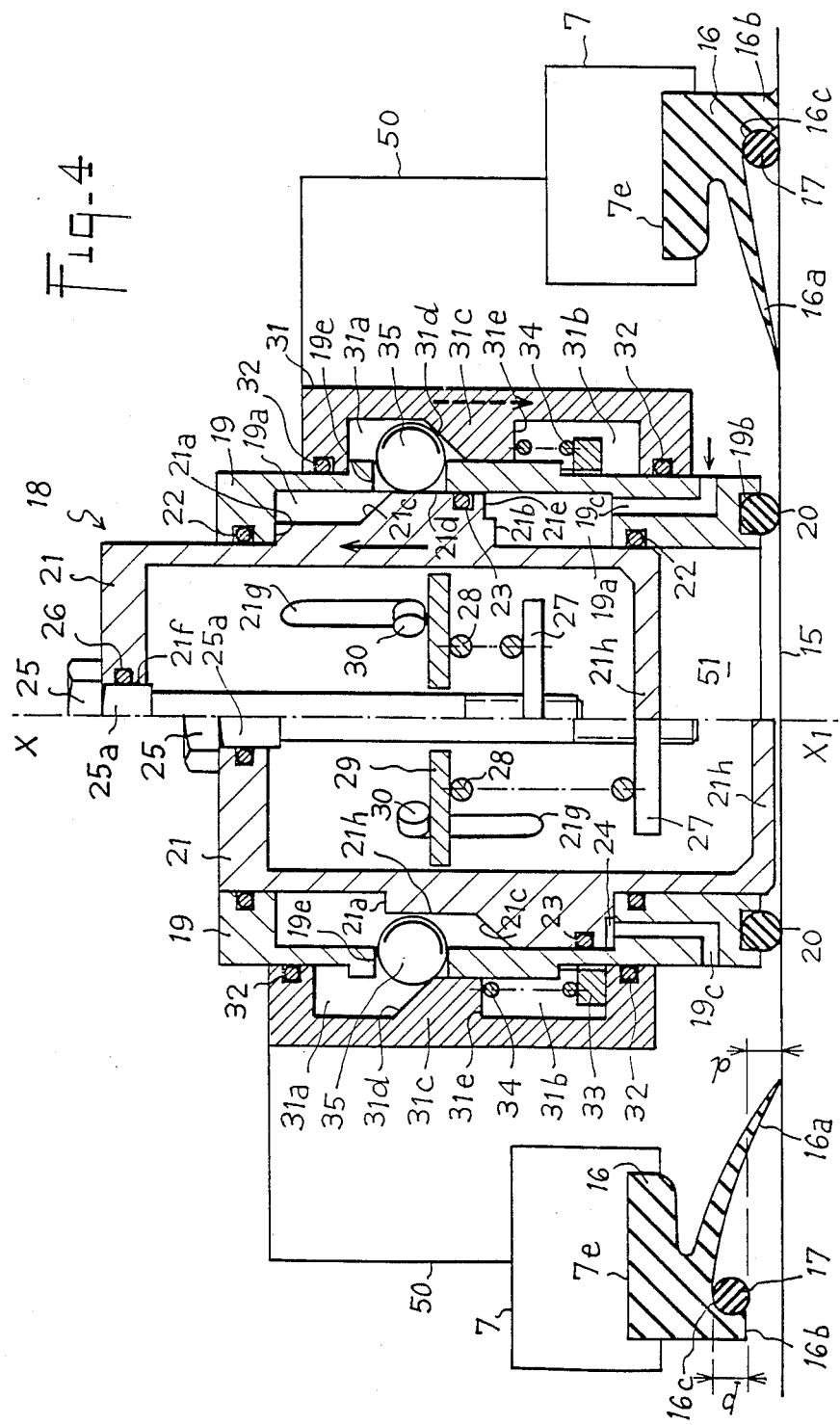

DEVICE FOR DETECTING MICRO-LEAKS OF GAS BY INFRARED RADIATIONS

FIELD OF THE INVENTION

The present invention relates to a device for detecting micro-leaks of gas by infrared radiations.

BACKGROUND OF THE INVENTION

The technical field of the invention is that of installations using infrared radiations for detecting, in the atmosphere or under water, micro-leaks of gas escaping for example through welding seams joining up plates to form a wall.

The method which consists in using the detection of the near-infrared ranging between 2 and 5 microns, with a camera for displaying temperature differences, is nowadays wellknown.

The application of this method to the detection of leaks consists in displaying thermal gradients caused by the expansion of a gas after its passage though an orifice of very small cross-section. Such application may take place in the atmosphere or under water.

When performing the detection under water, two fundamental problems have to be solved:

(a) first, there must not be any aqueous shield between the screen and the plate to be examined so that the infrared radiation is not absorbed; and (b) second, as heat diffusion inside the metal is very high, it is necessary to overcome it by a technical process. One accepted solution is to collect the fluid flow with a device permitting an adiabatic expansion.

In the case of small perturbations, it is possible, with the theory of internal variables which takes into account the two principles of thermodynamics and the FOURIER law, to write:

$$C.T. = \text{divergent } (k \text{ grad } T) - T\alpha\dot{\sigma} + D + \phi$$

C: is the volumetric specific heat
T: is the absolute ambient temperature
K: is the heat conductivity
α: is the thermal expansion
σ: is the stress
D: is the intrinsic dissipation
φ: is the density of the sources of heat.

In the equation developed hereinabove, the term "divergent (K grad T)" is very important in the case of metal, because of the value of coefficient K.

In order to solve the arising problem, the difficulty was divided with a device permitting to increase the value of the terms of the sources of temperature variations.

OBJECT OF THE INVENTION

It is the object of the invention to find a solution to the problems raised in (a) and (b) above, in an underwater application, although the invention can also find an application in the atmosphere.

These objects are reached according to the invention with a device for detecting micro-leaks of as by infrared radiations on a wall, which device is composed of an enclosure comprising an opening equipped with sealing means designed to be placed in contact with the wall; a kermeter tank, separated from said enclosure by a partition wall, said tank containing an infrared camera of which the objective is situated in front of a lens permeable to infrared radiations and fixed in said partition wall; means for sealingly applying the enclosure against said wall; means for creating a partial vacuum inside the enclosure, and an insulating screen placed in the center of the opening of the enclosure and applied against said wall in order to filtrate the gas leaks drawn in under the vacuum effect so as to obtain a thermal gradient detectable by thermovision.

Said screen is mounted inside a frame of outline parallel to the opening of the enclosure, which frame is subjected to the action of elastic means joined with the enclosure in order to keep the frame and the screen outside said opening so that, when the enclosure and the wall are closed together, the screen is applied against said wall.

According to one embodiment of the invention, said screen is produced from an insulating synthetic material with cells or open pores.

According to another embodiment of the invention, said screen is produced from a fine mesh insulating grid.

According to yet another embodiment, said enclosure which is semi-spherical, and said tank which is cylindrical, are co-axial and the objective of the camera is placed in such a way that the infrared radiation will affect the whole surface of the screen.

The edge surrounding the opening of the enclosure comprises a groove in which is fixed a seal comprising a heel and a flexible lip extending on one side of the heel, the lower part of said heel being, before the seal is applied on the wall, offset with respect the end of the lip seal.

Said lip forms with the lower part of the heel a trough-shaped dip of which the maximum depth "p" is substantially equal to the distance "d" separating the end of the lip and the lower part of the heel.

Said seal can further comprise, in the bottom of said dip and coupled to the heel, a roll of hydrophobic product.

Said device further comprises suction cups distributed on the periphery of the enclosure, which suction cups are provided for securing the device on the wall and for bringing the enclosure closer to said wall in order to correctly position the lip seal on said wall and to crush it before the enclosure is depressurized to perform the thermographic detection of the gas leaks.

Each suction cup is composed of three co-axial elements:

a cylinder equipped at its lower part with a seal adapted to come into contact with the wall;

a piston mounted for sliding in said cylinder and subjected to the action of elastic means forcing said piston back toward the lower part of the cylinder;

an annular body surrounding the cylinder and which is joined to the enclosure, said body being subjected to the action of elastic means forcing it back towards the upper part of the cylinder;

means for forcing the piston upwardly and for creating a partial vacuum inside the chamber thus formed at the lower part of the cylinder in order to apply the suction cup against the wall;

and means for simultaneously lowering said annular body in order to apply the enclosure against said wall.

The means provided for simultaneously moving the piston toward the top of the suction cup and the annular body toward the bottom, are balls, placed in housing formed at the same level in the wall of said cylinder and distributed on its periphery, said balls cooperating with conical shoulders of which one is reserved for the periphery of the piston and for its generatrices converging downwardly on the axis of symmetry of the suction cup, while the other is reserved for the inside of the annular body and for its generatrices converging from the top toward the bottom on said axis of the suction cup, in such a way that the balls, which are pushed by the shoulder of the piston during its upward stroke, come to rest on the shoulder of the annular body and, as the piston progresses upward, are expelled via the periphery of the piston into said annular body, coming then to reset on the conical shoulder of said body, and imparting a downward movement thereto.

BRIEF DESCRIPTION OF THE DRAWINGS

The invention will be more readily understood on reading the following description with reference to the accompanying drawings, in which:

FIG. 4 is a diametral section of a suction cup such as those with which the device shown in FIG. 3 is equipped. Said FIG. 4 also shows in cross-section the lip seal provided on the lower edge of the enclosure.

DESCRIPTION OF THE PREFERRED EMBODIMENTS

Figure 1:
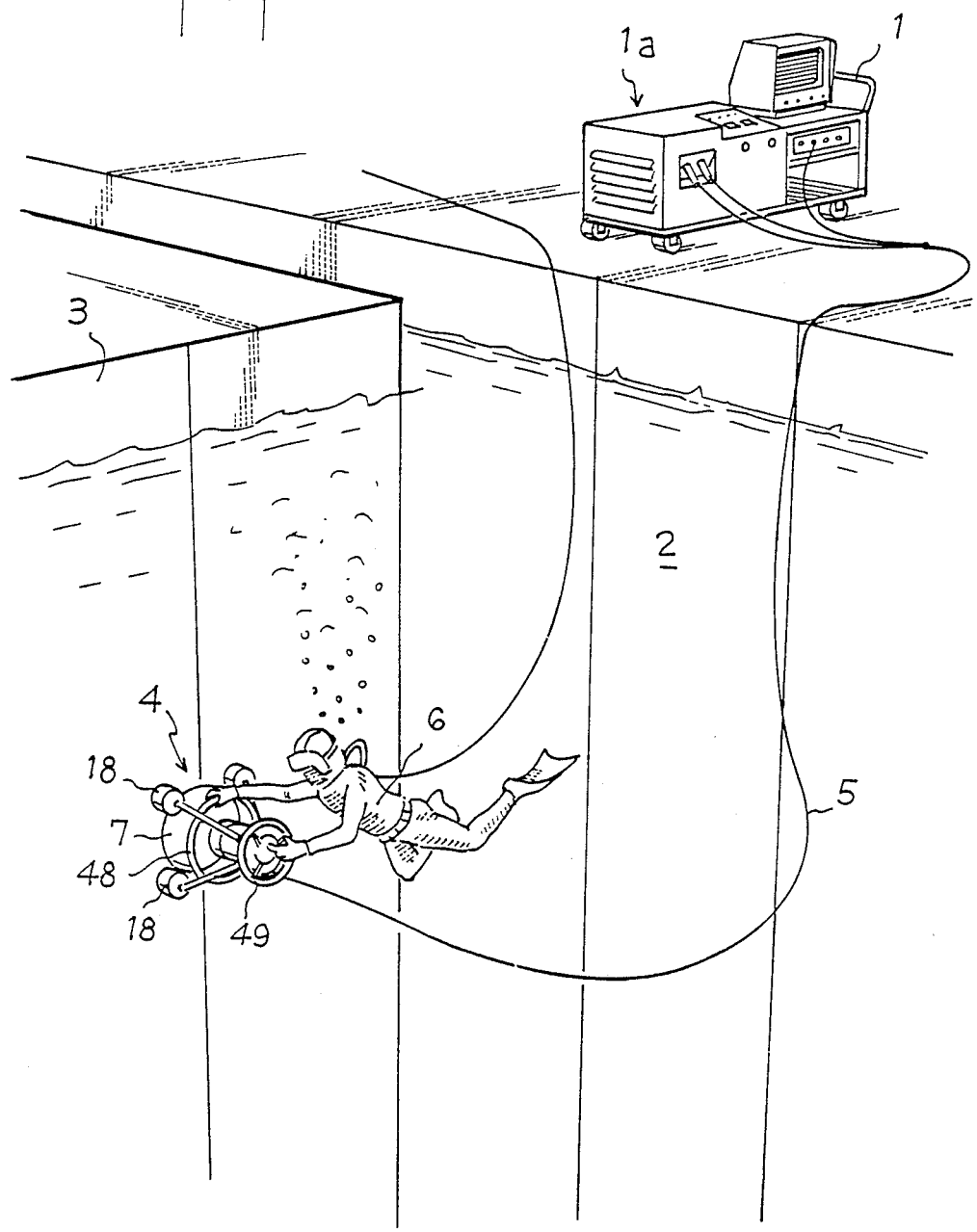
FIG. 1 is a perspective view illustrating an application of the device according to the invention for detecting gas leaks from a tank immersed in a pool.

Referring first to FIG. 1 of the drawings, this shows a mobile installation of detection comprising a trolley 1 mounted on wheels for moving on the ground surrounding a pool 2 in which is partly immersed a tank 3.

The trolley 1 supports a unit 1a containing the sources of power and the infrared images processing equipment necessary for using the installation.

Said unit is composed of an infrared video set, of an air compressor unit complete with its accessories and of a vacuum pump with recovery of the residual water by the pool 2.

Unit 1a is jointed to the device according to the invention 4 by a sealed umbilical, insulated from the ambient medium and containing the electrical, pneumatical and vacuum connections. By way of example, the length of said umbilical can be 50 meters.

As illustrated in the figure, device 4 is for example maneuvered by an operator carrying a diving equipment.

Said device 4 is composed (see FIGS. 2 and 3) of a semi-spherical bell-shaped enclosure, which comprises at its upper part, a kermetic tank 7a, for example of cylindrical shape. Enclosure 7 and tank 7a are co-axial and are separated by a wall 7b parallel to the plane containing the opening of enclosure 7.

Said wall 7b comprises a circular opening 7c in which is set a lens 8 permeable to infrared radiations ranging between 2 and 5 microns, for example in fluorine, silicon, germanium, or magnesium fluoride. An infrared detection camera 9 is placed inside the kermeter tank 7a, the objective of said camera being in contact with the face of lens 8 situated on the side of the tank 7a.

A distribution block 10, described hereinafter, closes off the tank 7a at its upper part. A seal is achieved by means of an O-ring 11 placed in a groove 7d provided in the peripheral wall of said tank 7a.

To avert the difficulty arising from the diffusion of heat through metal, the device comprises a screen 12 constituted by a synthetic material with open cells or pores, such as for example polyurethane foam, silk, filter paper, or a fine-meshed insulating grid. Said screen 12 is fitted in a frame 13 connected to the enclosure 7 via springs 14 in such a way that the screen 12 is, in the rest position, as illustrated on the left side of FIG. 3, slightly out of the opening of enclosure 7. Screen 12, with its frame 13, thus closes nearly completely the section of the opening of enclosure 7 and is applied, while the device is in operation on a wall 15 to be inspected, such as illustrated on the right side of FIG. 3.

Device 4 is applied to the metal wall to be analyzed 15, either by a diver 6, or by a robot such as for example a mini-submarine controlled from the surface. The attachment of the enclosure 7 to the wall 15 is achieved in two operations, as will be explained hereinafter.

Enclosure 7 is provided around its opening, with a groove 7e inside which is placed a lip seal 16 adapted so as to absorb level differences of between 3 and 5 millimeters resulting from the edge-to-edge welding of superposed plates.

The function of seal 16 is to ensure sealing of the enclosure 7 during the detection operation.

Figure 3:
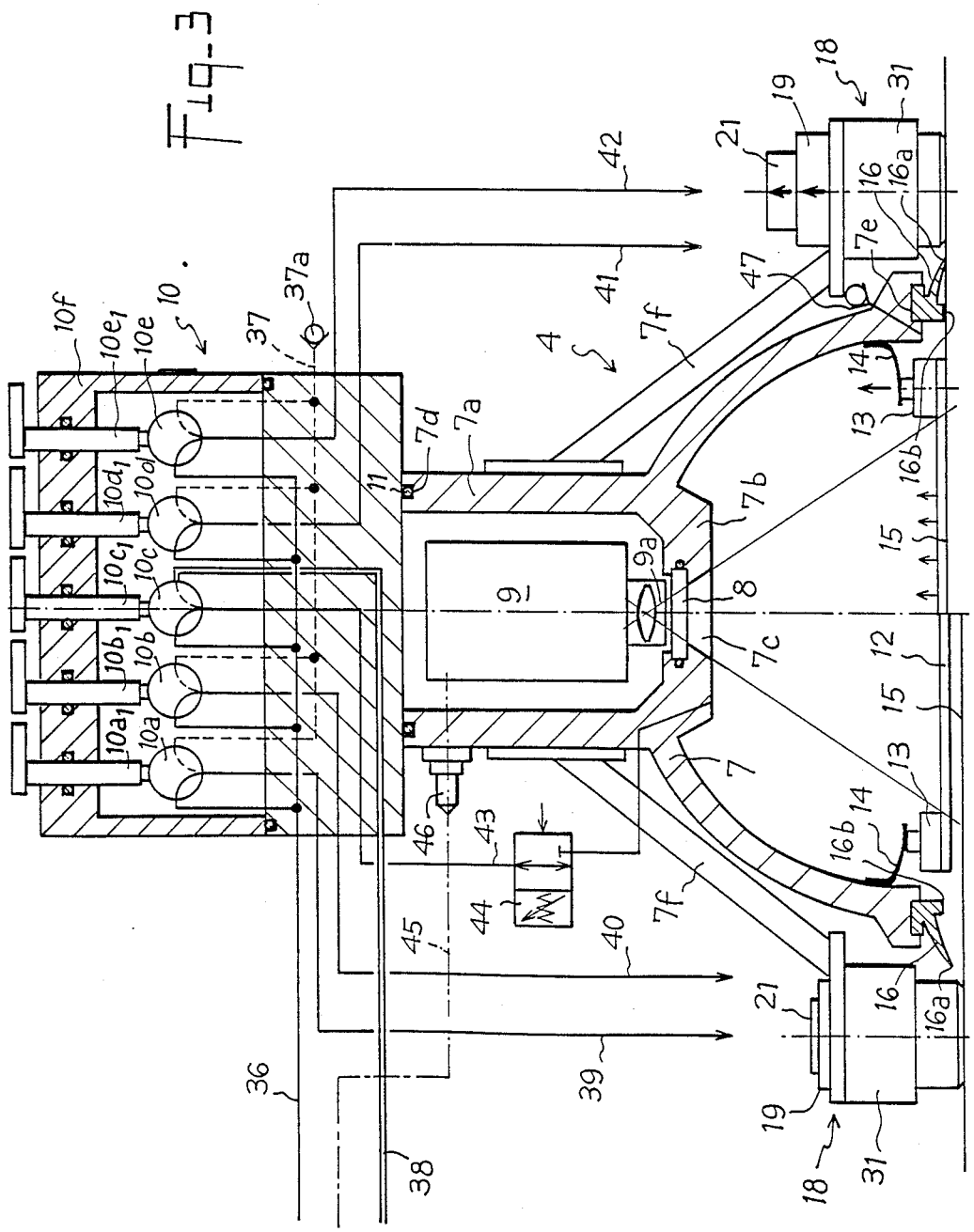
FIG. 3 diagrammatically illustrates a diametral section of the device according to the invention.

The seal 16 (FIGS. 3 and 4) is produced in elastomer and comprises a supple lip 16a and a heel portion 16b both of which constitute a trough-shaped depression 16c. As illustrated in FIG. 3, the lip 16a extends outwardly from the enclosure. Said lip is very tapered at its end and its thickness increases as far as said depression 16c, the depth "p" of which is substantially equal to the level difference to be absorbed. When the seal is not compressed, distance "d" separating the end of the lip from the lower part of the heel 16d is substantially equal to the depth "p" of said depression (see FIG. 4 on the left of the drawing).

To improve the bonding of the seal 16, it is possible to place in depression 16c a roll or bead of hydrophobic product such as silicon for example, in order to improve the adherence of the seal to the welding seams extending transversally to the device.

Said device further comprises suction cups 18, numbering for example four, which cups are fixed by any known means to the kermetic tank 7a via oblique arms 7f.

Figure 2:
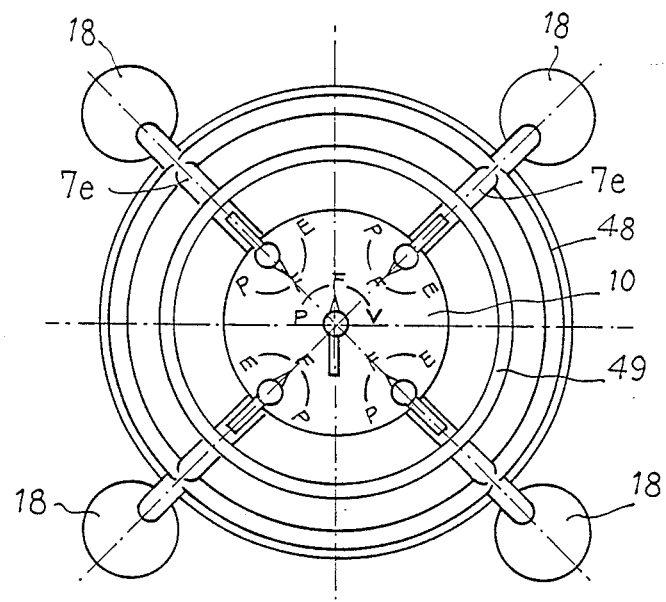
FIG. 2 is a plan view of the detection device according to the invention.

As illustrated in FIG. 2, the suction cups 18 are situated at 90° one from the other and are all on the same level with respect to the lower edge of the enclosure 7.

Referring now to FIG. 4 of the drawing, this shows on an enlarged scale, one of the suction cups 18 with which the device is equipped, said suction cup being composed of a cylinder 19 comprising an inner chamber 19a, which cylinder is open at its lower part and comprises, on its periphery, an O-ring 20, placed inside a groove 19b formed in the wall thickness.

A piston 21 is mounted for sliding in said cylinder, the external periphery of which piston cooperates with the ends of the cylinder 19 situated on either side of the annular chamber 19a. Sealing is achieved by O-rings 22 provided in grooves formed in the cylinder wall.

Said piston 21 is provided on its periphery with a first shoulder 21a designed to come to rest against the upper part of chamber 19a of the cylinder, a second shoulder 21b designed to come to rest on the lower part of said chamber 19a and a third conical shoulder 21 forming an angle of 45° with the horizontal and of which the generatrices converge from the top toward the bottom on the axis of symmetry X X₁ of the suction cup. The part of piston 21d which comprises the conical shoulder, cooperates with the inner face of the annular chamber 19a. Tightness is achieved by an O-ring placed in ag groove formed in the piston. Piston part 21d comprises, at its lower part and next to the shoulder 21b, a rabbet 21e which, when the piston is in low position, shoulder 21b being in contact with the lower part of the chamber 19a, forms an annular chamber of smalls section 24. Piston 21 is provided in its center and along the axis X X₁, with a screw 25 which extends inside the piston as far as the lower part thereof. Said screw 25 comprises a neck 25a of larger diameter than the stem, which neck is situated beneath its hexagonal head, said neck being passed through an orifice 21f provided in the center of the upper part of the piston. Sealing in this area is achieved by an O-ring 26. The stem 25b of the screw is threaded at its lower part in order to cooperate with a tapping provided in a support ring 27 of a spring likewise resting on another ring 29, which, in turn rests on cylindrical fingers 30 fixed to the cylinder 19 and extending at right angle to the cylinder 19 and to the piston 21 and slightly inside the latter. Said finger 30 cooperates with slots 21g parallel to axis X X₁ and which define the piston stroke. The spring 28, of which the tension is controlled by the screw 25, the effect of which is to move support ring 27, tends to place the piston 21 in resting contact by its shoulder 21b against the lower part of the annular chamber 19a. In this position, illustrated on the left of FIG. 4, the lower part 21h of the piston extends slightly outside the cylinder 19 without actually reaching the wall 15 due to the presence of the O-ring 20. Cylinder 19 is provided, at its lower part, with ducts 19c issuing into annular chamber 19 at right angle with the rabbet 21e of the piston.

An annular body 31 is slidably mounted about cylinder 19, which annular body comprises two inner chambers 31a/31b separated by a wall 31c forming, at its upper part, a conical should 31d which forms an angle of 45° with the horizontal and of which the generatrices converge, from the top toward the bottom on axis X X₁.

Wall 31c is also provided at its lower part with another shoulder 31e.

Sealing between the annular body and the cylinder 19 is achieved by O-rings 32, placed inside grooves formed in said body and at its upper and lower end parts.

The cylinder 19 comprises, on its periphery and on its lower part side, a thread 19d on which is screwed a ring 33. A spring 34 resting, on the one hand, on the ring 33 and, on the other hand, on the shoulder 31e, tends to push the annular body 31 toward the upper part of the suction cup (see FIG. 4, left of the drawing). In this position of annular body 31, the conical shoulder 31d is placed in contact with a plurality of balls 35, which balls are all on the same level and are housed in circular orifices 19e formed in the wall of cylinder 19. Said balls 35, numbering for example four, and placed at 90°, are in resting contact on the cylindrical part 21h of the piston extending between conical shoulder 21c and shoulder 21a.

Balls 35 and fingers 30 are all on the same level, their axes being situated inside a plane perpendicular to axis X X₁.

The four suction cups are fixed to the sealed tank 7a which extends the semi-spherical enclosure 7 upwardly, and via oblique arms 7f which are themselves fixed to the bodies 31 of the suction cups.

The distribution block 10 comprises five three-way valves 10a . . . 10e, the controls 10a₁. . . 10e₁ of which extend out of the casing 10f.

Said valves are in connection with circuits which are connected to the different members of the device: a compressed air circuit 36, an air exhaust circuit 37, equipped with a valve 37a; a vacuum circuit 38; connection circuits 39/40/41/42 reaching to the suction cups 18. The valve 10c is connected with the enclosure 7 via a circuit 43 equipped with a pressure reducing valve 44. The camera 9 is supplied by an electric circuit 45 which is passed through as sealed conduit 46.

The enclosure 7 is provided, at its lower part, with water discharging valves 47 distributed over its periphery.

For gripping the apparatus, in particular to allow it to be maneuvered by a diver, concentric tubular circles 48/49 are fixed to the enclosure 7 and to the sealed tanks 7a.

In FIG. 4, the lines 50 illustrate very diagrammatically the connection between the annular bodies 31 of the suction cups with the enclosure 7 and its sealed extension.

As illustrated on the left of FIG. 3, the lower part of the suction cups 18, before enclosure 7 is applied on wall 15, are all inside the same plane situated under the seal 16 and the screen 12.

Equipments 1 and 4 are brought on the site. Then they are connected and tested for good working order: video, compressed air, vacuum, . . . Then, the sealing of the apparatus 4 and of the umbilical 5, is tested.

The leak-detecting device 4 using infrared is immersed and brought on the welding seam to be tested for example by a driver (or by a robot).

It is fastened to the wall 15 via the suction cups 18, by actuating valves 10a/10b/10d/10e, said suction cups ensuring the accurate positioning of the seal 16. At the beginning of the operation, all the elements are in rest position. The seals 20 are brought in resting contact against the wall 15, the pistons 21 extend slightly under the cylinders 19 in order to reduce the volume of water in the zones defined by seals 20.

The compressed air brought to the suction cups via circuits 39/40/41/42, is admitted through ducts 19c into annular chamber 19a of cylinders 19. the pistons 21 are pushed upwardly of the suction cup while compressing the springs 28. A suction is then created in chambers 51, the effect of which is to fasten the suction cups.

During the upward stroke of the piston 21, the balls 35 which were resting on conical shoulder 31d, are shifted laterally, first by conical shoulder 21c and then by the cylindrical part 21d of the pistons in order to penetrate partly into annular chambers 31a. Said balls, by cooperating with said shoulders 31d, cause, by reaction, the lowering of annular body 31 which then comes into abutment on the cylinder 19 while compressing the springs 34. The bearing force of said springs is controlled by rings 33.

The pistons 21 are pushed in abutment against chambers 19a of the cylinders 19 under the effect of springs 28 which, at that time, are compressed.

The force of said springs 28 is adjusted by actuating screws 25 the threaded end of which is screwed in the rings 27.

The axial up and down movement of the bodies 31 of the suction cups which are joined to the enclosure 7 has the effect of applying the seal 16 against the wall 15 and also of applying the screen 12 against said wall above the welding seam to be tested.

The valve 10c is actuated and the water is expelled from the enclosure via valve 47 under the effect of the compressed air.

Enclosure 7 is then depressurized by connecting it with the vacuum circuit 38, the effect of which is to apply the enclosure while achieving complete adherence at the level of seal 16.

The infrared camera is set into operation and the welding seam is tested.

At the end of this operation, and in order to move the device 4, enclosure 7 is re-pressurized by actuating the valve 10c and the pressure is cancelled in chambers 19c of the suction cups, this causing the pistons 21 to resume their initial rest position, as illustrated on the left of FIG. 4.

Simultaneously, the balls 35 are driven back against the cylindrical part 21h of the pistons and the annular bodies 31 resume their initial position, which causes the release of seal 16 and correlativelly, the release of the apparatus 4.

Apparatus 4 can then be moved along the welding seam to repeat the control operation throughout the length of said seam.

What is claimed is:

1. Device for detecting micro-leaks of gas by infrared radiations on a wall, of the type comprising an enclosure provided with an infrared camera and further provided with an opening equipped with sealing means designed to be placed in contact with the wall, means for sealingly applying said enclosure against said wall and means for creating a partial vacuum inside said enclosure, device wherein said infrared camera is placed inside a sealed tank separated from the enclosure by a partition wall, and has its objective situated in front of a lens permeable to infrared radiations and fixed in said partition wall, and has its comprising an insulating screen placed in the center of the opening of the enclosure and applied against said wall for filtering the gas leaks drawn by the effect of the vacuum, as so to obtain a thermal gradient detectable by thermovision.

2. Device as claimed in claim 1 for detecting micro-leaks of gas by infrared radiations on an immersed wall, which comprises means for expelling the water from the enclosure under the effect of a stream of compressed air before using the means for creating said partial vacuum in the enclosure.

3. Device as claimed in claim 1, wherein said screen is mounted in a frame of outline parallel to the opening of the enclosure, said frame being subjected to the action of elastic means which are joined to the enclosure in order to keep the frame and the screen outside said enclosure, such that, when the enclosure and the wall are close together, the screen is applied against said wall.

4. Device as claimed in claim 3, wherein said screen is produced from a synthetic insulting material with open cells or pores.

5. Device as claimed in claim 3, wherein said screen is produced from a fine-meshed insulating grid.

6. Device as claimed in claim 1, wherein said enclosure, which is semi-spherical, and said tank, which is cylindrical, are co-axial, and the objective of the camera is placed in such a way that the field of infrared radiations covers the whole surface of the screen.

7. Device as claimed in claim 1, wherein an edge around the opening of the enclosure, comprises a groove in which is fixed a seal comprising a heel portion and a supple lip extending on one of the sides of said heel portion, the lower part of which is, before the seal is applied against the wall, offset with respect to the end of the lip of the seal.

8. Device as claimed in claim 7, wherein said lip forms with the lower part of the heel portion, a trough-shaped depression, of which the maximum depth "p" is substantially equal to the distance "d" between the end of the lip and the lower part of the heel portion.

9. Device as claimed in claim 8, wherein the seal comprises a roll of hydrophobic product, contained at the bottom of the depression abreast of said heel portion.

10. Device as claimed in claim 9, wherein said device further comprises suction cups, distributed on the periphery of the enclosure and situated substantially inside the plane of the opening of said enclosure, said suction cup being adapted to secure the device on the wall and to bring the enclosure closer to said wall, so as to accurately position the lip seal on the wall and deform it, before depressurizing the enclosure to carry out the thermographic detection of gas leaks.

11. Device as claimed in claim 10, wherein each suction cup is composed of three co-axial elements:
   a cylinder equipped at its lower part with a seal designed to come into contact with the wall;
   a piston, mounted for sliding in said cylinder and subjected to the action of elastic means forcing said piston back toward the lower part of the cylinder;
   an annular body surrounding the cylinder and which is joined to the enclosure, said body being subjected to the action of elastic means forcing it back toward the upper part of the cylinder;
   means for forcing the piston upwardly and for creating a partial vacuum inside the chamber thus formed at the lower part of the cylinder in order to apply the suction cup against the wall;
   and means for simultaneously lowering said annular body in order to apply the enclosure against said wall.

12. Device as claimed in claim 11, wherein the means provided for simultaneously moving the piston toward the top of the suction cup and the annular body toward the bottom, are balls, placed in housings formed at the same level in the wall of said cylinder and distributed on its periphery, said balls cooperating with conical shoulders of which one is reserved for the periphery of the piston and for its generatrices converging downwardly on the axis of symmetry of the suction cup, while the other is reserved for the inside of the annular body and for its generatrices converging from the top toward the bottom on said axis of the suction cup, in such a way that the balls, which are pushed by the shoulder of the piston during its upward stroke, come to rest on the shoulder of the annular body and, as the piston progresses upward, are expelled via the periphery of the piston into said annular body, coming then to rest on the conical shoulder of said body, and imparting a downward movement thereto.

* * * * *